United States Patent
Hwang

(10) Patent No.: US 6,233,664 B1
(45) Date of Patent: May 15, 2001

(54) APPARATUS AND METHOD FOR SWAPPING CONTENTS BETWEEN MAIN MEMORY AND AUXILIARY MEMORY AND WEB VIDEO PHONE ADOPTING THE APPARATUS

(75) Inventor: Jae-sik Hwang, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/206,237

(22) Filed: Dec. 7, 1998

(30) Foreign Application Priority Data

Jun. 19, 1998 (KR) .................................................. 98-23201

(51) Int. Cl.⁷ ...................................................... G06F 9/445
(52) U.S. Cl. ......................... 711/165; 711/159; 711/154; 711/208; 709/106
(58) Field of Search ...................... 711/165, 159, 711/208, 154; 209/106

(56) References Cited

U.S. PATENT DOCUMENTS

| | | | |
|---|---|---|---|
| 4,733,367 | * 3/1988 | Taniguchi | 364/900 |
| 5,212,633 | * 5/1993 | Franzmeier | 903/23 |
| 5,293,599 | * 3/1994 | Kagimasa et al. | 711/159 |
| 5,371,871 | * 12/1994 | Spilo | 711/154 |
| 5,761,280 | * 6/1998 | Noonen et al. | 379/93.27 |
| 5,809,564 | * 9/1998 | Craze et al. | 711/208 |
| 6,020,916 | * 2/2000 | Gerszberg et al. | 348/15 |

FOREIGN PATENT DOCUMENTS

| | | | |
|---|---|---|---|
| 54-75232 | 6/1979 | (JP) | G11C/9/00 |
| 7-152642 | 6/1995 | (JP) | G06F/12/08 |
| 7-212253 | 8/1995 | (JP) | H04B/1/034 |
| 10-21082 | 1/1998 | (JP) | G06F/9/445 |
| 11-205762 | 7/1999 | (JP) | H04N/7/14 |

* cited by examiner

Primary Examiner—Do Hyun Yoo
Assistant Examiner—Mehdi Namazi
(74) Attorney, Agent, or Firm—Sughrue, Mion, Zinn, Macpeak & Seas, PLLC

(57) ABSTRACT

An apparatus and method for swapping program code and data between a main memory and an auxiliary memory, and a web video phone adopting the apparatus, are provided. The web video phone includes a key input unit for inputting a command of execution of an application program, a flash memory for storing application programs such as a video phone application using the H.324 protocol, an Internet phone application using the H.323 protocol, a web browser, an e-mail application, and a personal information management system (PIMS), a DRAM including a program code region and a data region for storing program codes downloaded from the flash memory and data swapped from the flash memory, and a main processor for controlling the program code of each application program stored in the flash memory to be stored in the program region of the DRAM and controlling the swapping between the data of each application program stored in the flash memory and the data stored in the data region of the DRAM, in response to an execution command of an application program input through the key input unit. Therefore, all application programs can be driven by a small capacity DRAM, and can be easily, individually managed.

18 Claims, 5 Drawing Sheets

APPARATUS AND METHOD FOR SWAPPING CONTENTS BETWEEN MAIN MEMORY AND AUXILIARY MEMORY AND WEB VIDEO PHONE ADOPTING THE APPARATUS

BACKGROUND OF THE INVENTION

1. Field of the Invention

The present invention relates to a swapping apparatus and method, and more particularly, to an apparatus and method for swapping program code and data between a main memory and an auxiliary memory, and a web video phone adopting the apparatus.

2. Description of the Related Art

Swapping includes the exchange of contents stored in a main memory with contents stored in an auxiliary memory. Here, swapping includes swap-in and swap-out. Swap-in is the transfer of a program having high priority from the auxiliary memory to the main memory. Swap-out is the transfer of a program having low priority from the main memory to the auxiliary memory.

FIG. 1 is a block diagram of a conventional web video phone which does not adopt a swapping apparatus.

Referring to FIG. 1, a DRAM 10, being a type of main memory, has a basic program code region 102 for storing a real time OS (operating system) code and a main menu, and a program code and data region 104 for swapping application programs in a flash memory 12.

The flash memory 12, being a type of auxiliary memory, stores application programs (122, 124, 126, . . . and 128) static-linked to an OS library. In the web video phone of FIG. 1, all application programs stored in the flash memory 12 are downloaded into the DRAM 10 all at once in the power starting sequence.

However, the web video phone of FIG. 1 has the following problems.

First, since the application programs static-linked to the OS library cannot be separated, they are downloaded into the DRAM 10 all at once, which requires a DRAM having a large capacity. That is, the DRAM 10 must have a capacity of at least 4M byte to download four application programs, each of 1M byte size from the flash memory 12 to the DRAM 10. Second, in the static linking of application programs stored in the flash memory, even when only one application program is changed, the other application programs must be recompiled and linked, which results in difficult management of the application programs.

SUMMARY OF THE INVENTION

To solve the above problems, it is an objective of the present invention to provide an apparatus and method of swapping between main and auxiliary memories for swapping program code and data into a predetermined region of a DRAM, for only an application program, to be used for execution by an input unit, from among a plurality of application programs stored in an auxiliary memory, and a web video phone adopting the apparatus.

Accordingly, to achieve the above objective, there is provided an apparatus for swapping program code and data between a main memory and an auxiliary memory, comprising: an auxiliary memory for storing a plurality of application programs including program codes and data; a virtual address table for storing a start address of each application program stored in the auxiliary memory; a main memory having a program code region and a data region for storing a program code downloaded from the auxiliary memory and data swapped from the auxiliary memory; and a swapping controller for controlling the program codes of the programs to be downloaded into the program code region of the main memory with reference to addresses stored in the virtual address table, and controlling the swapping between the data of the programs and data stored in the data region of the main memory, in response to a request input via a user interface to execute the application programs.

To achieve the above objective, there is provided a method of swapping program code and data between a main memory and an auxiliary memory, comprising the steps of: (a) determining whether the program code of an application program to be executed exists in a program code region of the main memory; (b) downloading a program code stored in the auxiliary memory into a program code region of the main memory, when it is determined in step (a) that the program code does not exist in main memory; (c) swapping data of an application program stored in the auxiliary memory for data stored in the data region of the main memory; and (d) loading to a program counter a start address of the program downloaded into the main memory in step (b) and executing the program code from the start address.

To achieve the above objective, there is provided a web video phone wherein program code and data of a DRAM and a flash memory are swapped, comprising: a key input unit for inputting a command of execution of an application program; a flash memory for storing application programs including at least a video phone using the H.324 protocol, an Internet phone using the H.323 protocol, a web browser, an e-mail program, and a personal information management system (PIMS); a DRAM including a program code region and a data region for storing program codes downloaded from the flash memory and data swapped from the flash memory; and a main processor for controlling the program code of each application program stored in the flash memory to be stored in the program region of the DRAM and controlling the swapping between the data of each application program stored in the flash memory and the data stored in the data region of the DRAM, in response to an execution command of an application program input through the key input unit.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1:
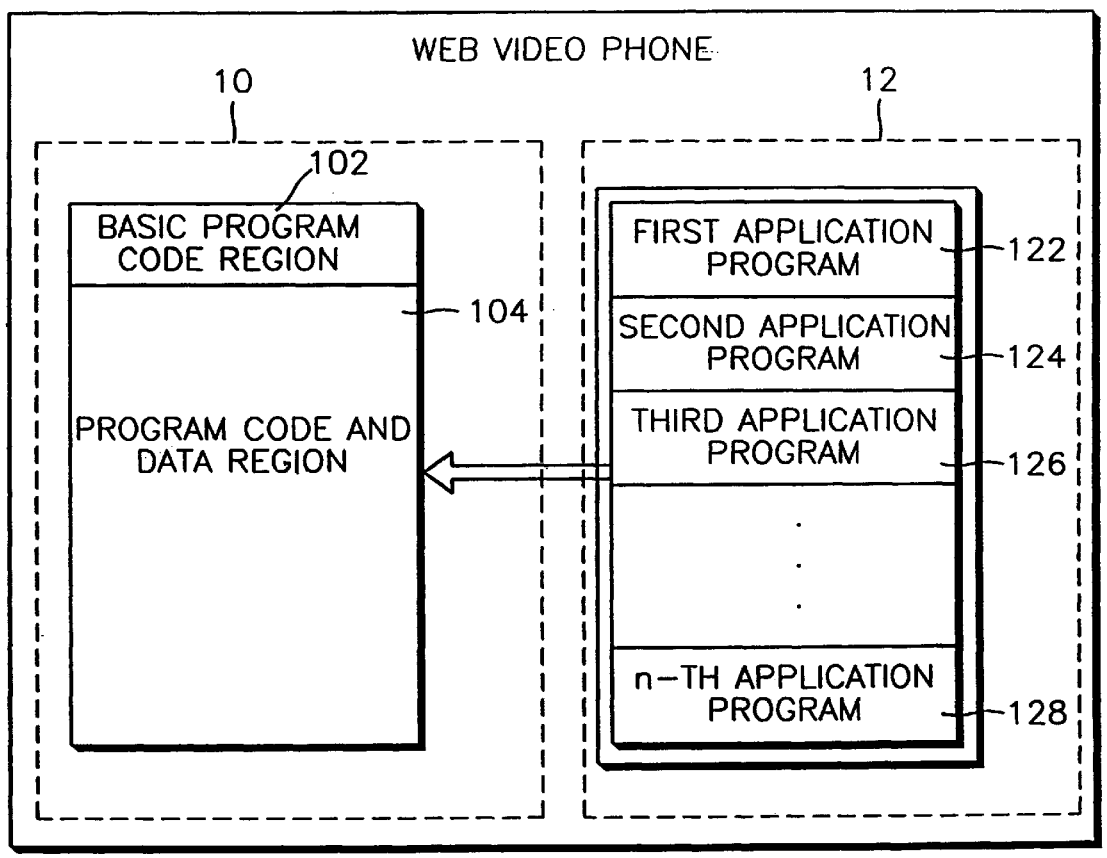
FIG. 1 is a block diagram of a conventional web video phone which does not adopt a swapping apparatus.
Figure 2:
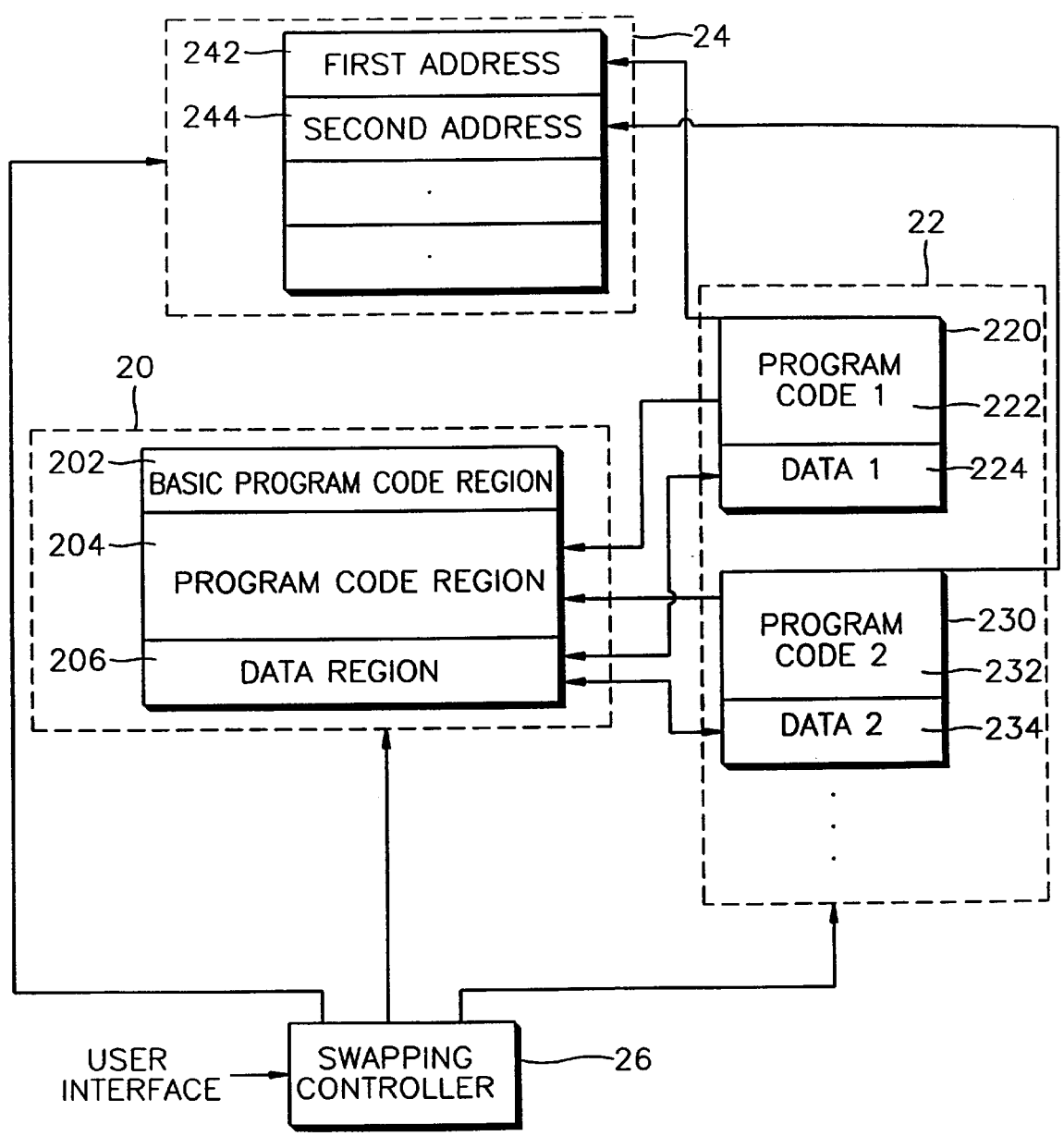
FIG. 2 is a block diagram of an apparatus for swapping between main and auxiliary memories according to the present invention.

Referring to FIG. 2, an apparatus for swapping program code and data between a main memory and an auxiliary memory according to the present invention comprises a DRAM 20, a flash memory 22, a virtual address table 24, and a swapping controller 26. Here, the DRAM 20 is a main memory, and the flash memory 22 is an auxiliary memory.

The flash memory 22 stores a plurality of application programs including first and second application programs 220 and 230. The application program stores a program code and data.

The DRAM 20 includes a basic program code region 202, a program code region 204, and a data region 206.

The basic program code region 202 stores a real time OS (operating system) code and a basic program code. The basic program code displays a main menu necessary to interface with a user, and processes a user input.

The program code region 204 is a region into which the program codes (222, 232, . . . ) of the application programs (220, 230, . . . ) in the flash memory 22 are downloaded. It is preferable that the capacity of the program code region 204 is larger than that of each of the program codes (222, 232, . . . ) of the application programs (220, 230, . . . ).

The data region 206 is swapped for the data (224, 234, . . . ) of the application programs (220, 230, . . . ) in the flash memory 22.

The virtual address table 24 stores starting addresses of the application programs (220, 230, . . . ). First and second addresses 242 and 244 are addresses where the first and second application programs 220 and 230 start, respectively.

The swapping controller 26 performs the following control in response to an execution command of the first application program 220 input via the user interface. First, the swapping controller 26 controls downloading of the program code 1 220 of the flash memory 22 into the program code region 204 of the DRAM 20 with reference to the first address 242 stored in the virtual address table 24. Also, the swapping controller 26 controls swapping of data stored in the data region 206 of the DRAM 20 for the data 1 224 in the flash memory 22.

Details of the control operation of the swapping controller 26 will now be described.

After a system is turned on, it is determined whether the first application program is to be downloaded first. If it is determined that the first application program will be downloaded first, the program code 1 222 is controlled to be downloaded into the DRAM 20, and the data 1 224 of the first application program 220 in the flash memory 22 is controlled not to be downloaded into the DRAM 20 for the first application program.

Upon completion of the first application program, the swapping controller 26 stores data stored in the data region 206 of the DRAM, in the data 1 224. That is, the swapping between data of the DRAM and data of the flash memory occurs when each application program is downloaded into the DRAM two or more times.

In addition, on a subsequent selection of a different program, the swapping controller 26 controls swapping of data stored in the data region of the DRAM 20 for the data 1 224 stored in the flash memory 22, in response to an execution command with respect to the second application program 230 by a user interface. Also, the program code 2 232 in the flash memory 22 is controlled to be written over the program code 1 220 stored in the program code region 204 of the DRAM 20, and the data 2 234 in the flash memory 22 is controlled to be swapped for the data stored in the data region of the DRAM 20.

Figure 3:
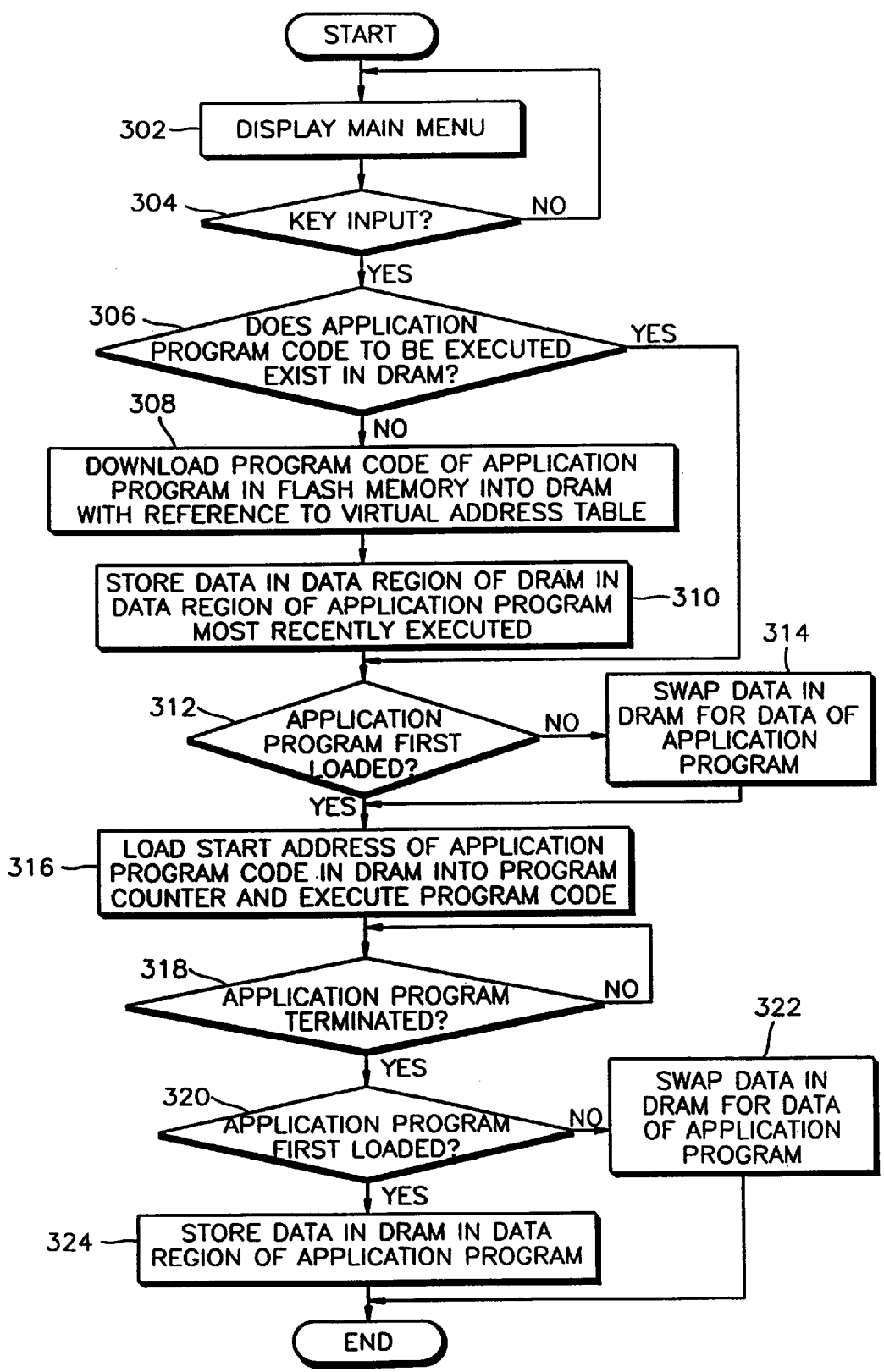
FIG. 3 is a flowchart illustrating a method for swapping between main and auxiliary memories according to the present invention.

In FIG. 2, when each application program has a significantly large capacity, it takes too much time to download the application program into the flash memory 22. This can badly influence the performance of the system, so it is preferable that each application program is small. Also, preferably, the physical reading/writing of the flash memory 22 is fast, FIG. 3 is a flowchart illustrating a method of swapping between a main memory and an auxiliary memory, according to the present invention.

Figure 5:
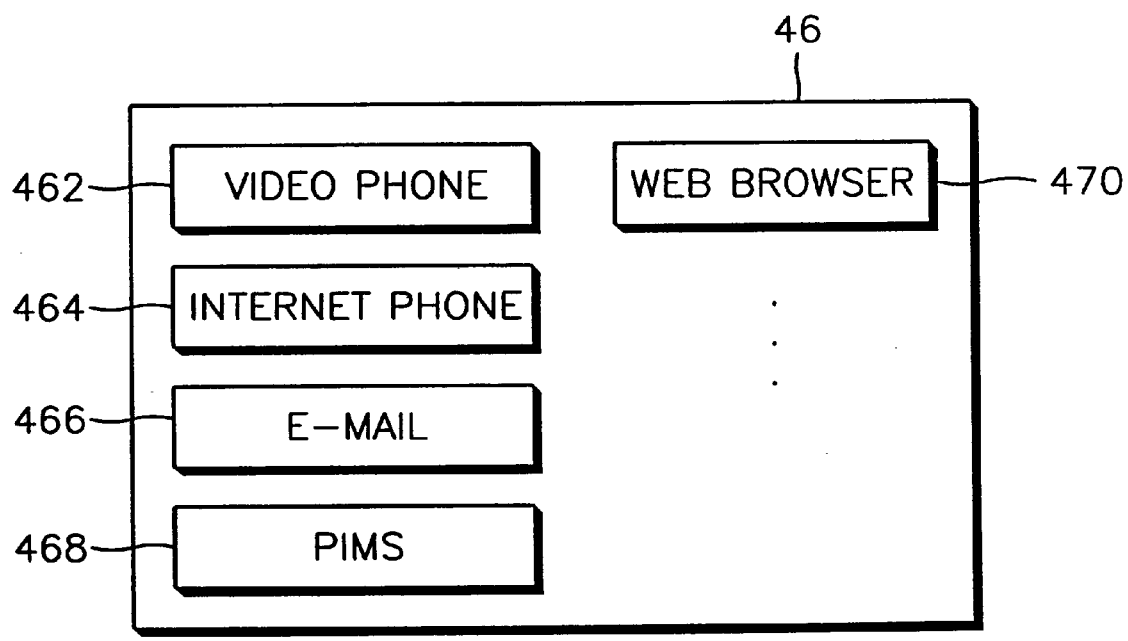
FIG. 5 is a block diagram showing a main menu displayed in the display shown in FIG. 4.

A main menu is displayed in step 302. An LCD 46 shown in FIG. 5 displays menu selections such as video phone 462, Internet phone 464, E-mail 466, personal information management system (PIMS) 468, web browser 470, etc.

A determination of whether a user has activated a key input is made, in step 304. An affirmative outcome of the key input step means that a desired application to be executed is selected from the menu selections displayed in FIG. 5, using a touch screen or an input device such as a key-pad.

The remaining steps of the swapping method according to the present invention will be described, assuming that a user selects the first application program 220 shown in FIG. 2.

It is determined whether the program code 1 222 of the selected first application program, i.e., a code of the application program desired to be executed, exists in the program code region 204 of the DRAM 20, in step 306.

If the program does not presently exist in the DRAM, the program code 1 220 stored in the flash memory is downloaded into the program code region 204 of the DRAM referring to the virtual address table 24, in step 308.

Data presently stored in the data region 206 of the DRAM is stored in the corresponding data region of the latest application program (i.e., which is executed right before the program code 1 is downloaded) in the flash memory, in step 310. If the program code 1 is detected in step 306, step 312 is performed.

It is determined whether the program code 1 loaded in the program code region 204 of the DRAM is a program code first loaded after the system is turned on, in step 312.

If it is determined that the program code 1 is not the first loaded one, the data stored in the data region 206 of the DRAM and the data 1 224 of the first application program are swapped, in step 314.

If it is determined that the program code 1 is the first loaded one, a starting address of the program code 1 222 of the first application program in the DRAM is loaded in a program counter (PC), and the program code 1 222 loaded in the DRAM is executed, in step 316. No data is swapped from the flash memory if it is determined that the program code 1 is the first application program to be executed after start up.

It is determined whether an end command with respect to the program code 1 of the first application program is input, in step 318.

If the end command has been input, it is determined whether the currently-executed program code 1 is a code first loaded after the system is turned on, in step 320.

If the program code 1 was the first loaded application, data stored in the data region 206 of the DRAM is stored in the data 1 224 of the first application program in the flash memory, in step 324.

If the program code was not the first loaded application, the data stored in the data region 206 of the DRAM and the data 1 224 of the first application program are swapped, in step 322.

Figure 4:
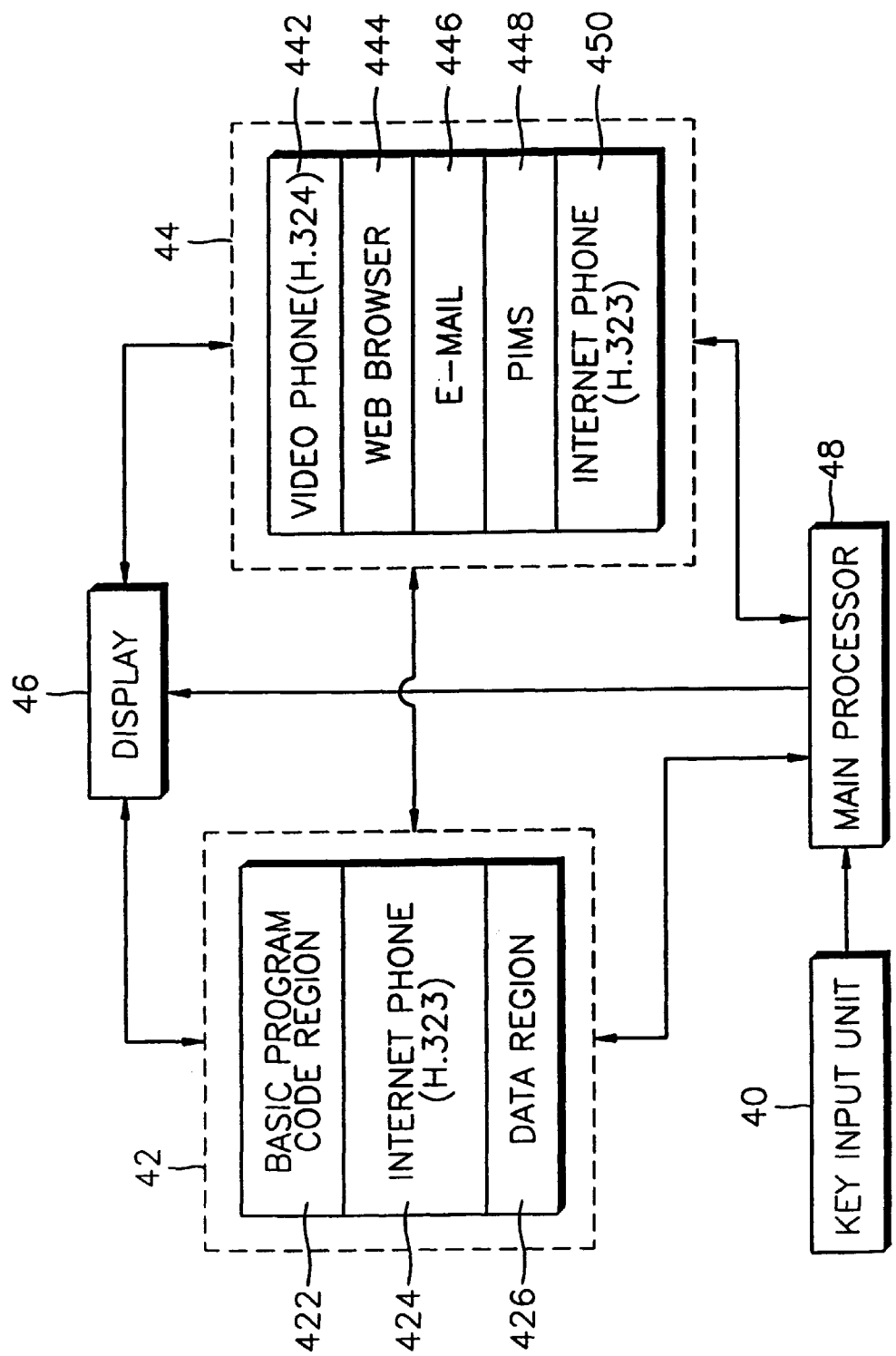
FIG. 4 is a block diagram of a web video phone adopting a swapping apparatus according to the present invention.

FIG. 4 is a block diagram of a web video phone adopting a swapping apparatus according to the present invention.

Referring to FIG. 4, the web video phone includes a key input unit 40, a DRAM 42, a flash memory 44, a display 46 and a main processor 48.

The DRAM 42 comprises of a basic program code region 422, a program code region 424, and a data region 426. An Internet phone application using the H.323 protocol is stored in the program code region 424.

The flash memory 44 stores a video phone application 442 using the H.324 protocol, a web browser application 444, an e-mail application 446, a PIMS application 448, and an Internet phone application 450 using the H.323 protocol.

The main processor 48 performs the following controls in response to an execution command with respect to an application program input by a user using the key input unit 40 after viewing the menu selections displayed on the display 46. A program code of an application program in the flash memory 44 is controlled to be stored in the program code region 424 of the DRAM 42. Also, the main processor 48 controls the swapping between the data of each application program in the flash memory 44 and data stored in the data region 426 of the DRAM 42.

The operation of the web video phone shown in FIG. 4 will now be described, on the assumption that the Internet phone application 450 using the H.323 protocol was selected through the key input unit 40 among the application programs 442 through 450 stored in the flash memory 44.

When the code of the Internet phone 450 using the H.323 protocol already exists in the program code region 424 of the DRAM 42, the main processor 48 prevents downloading from the flash memory 44 to the DRAM 42. Also, when the Internet phone 450 is a program first loaded after a system is turned on, the main processor 48 prevents data (not shown) of the Internet phone application 450 stored in the flash memory 44 from being downloaded into the DRAM 42. Data stored in the data region 426 of the DRAM upon termination of the Internet phone application 450 is stored in a data region (not shown) of the Internet phone application 450. When the Internet phone application 450 is downloaded two or more times after the system is turned on, the data stored in the data region 426 of the DRAM upon termination and the data stored in the data region (not shown) of the Internet phone application 450 are swapped.

Meanwhile, the embodiment of the present invention can be written in a program capable of being executed in a computer. Also, the embodiment can be realized in a general purpose digital computer which operates the program from media used in the computer. The media can be a magnetic storage media (e.g.: ROM, floppy disks, hard disks, etc.), optical read media (e.g.: CD-ROM, DVD, etc.), or recording media such as a carrier wave (e.g.: transmission through Internet).

In the method of swapping contents of a main memory and an auxiliary memory, the recording media stores the code of a program which can perform the following four steps in the computer.

The first step is determining whether the program code of an application program to be executed exists in a code region of the main memory. The second step is downloading a program code stored in the auxiliary memory into a program code region of the main memory when it is determined in the first step that the program code does not presently exist in main memory. The third step is swapping data of the application program stored in the auxiliary memory and the data stored in the data region of the main memory. The fourth step is loading into a program counter a start address of the program code downloaded into the main memory in the second step and executing the program code from the start address.

The program code further includes a program code which can perform the following fifth and sixth steps.

The fifth step is determining whether the program code downloaded into the main memory is the first loaded into main memory after a system is turned on. The sixth step is storing data in the data region of the main memory in the data region corresponding to the most recently executed application program, when it is determined in the fifth step that the program code is the first to be first loaded.

The program code further includes a program code which can perform the following seventh and eighth steps.

The seventh step is determining whether the program code downloaded in the second step is data first loaded after a system is turned on, when a termination command of the application program executed in the main memory is input. The eighth step is storing data stored in the data region of the main memory in the data region of the application program executed in the fourth step, when it is determined in the seventh step that the program code has been first loaded.

The program code further includes a program code which can perform the step of swapping the data stored in the data region of the main memory and the data stored in the data region of the executed application program, when it is determined in the seventh step that the program code has not been first loaded.

Also, the program code further includes a program code which can perform the following ninth and tenth steps.

The ninth step is determining whether an execution command of another application program is input by a user. The tenth step is storing the data stored in the data region of the main memory in the data region corresponding to the most recently executed application program and storing data of the another application program in the ata region of the main memory, when it is determined in the ninth step hat the execution command another application program has been input.

Functional programs, codes and code segments for realizing the present invention can be easily inferred by programmers in a technical field to which the present invention belongs.

The present invention is not limited to the above embodiment, and it is apparent that modifications may be effected by those skilled in the art within the spirit of the present invention. That is, in the embodiment of the present invention, a DRAM and a flash memory was taken as the example of a main memory and an auxiliary memory, respectively. However, a high-speed read/write memory can be used instead of the DRAM, and a low-speed nonvolatile read/write memory can be used instead of the flash memory.

According to the present invention, only an application program requested by an input device to be executed among many application programs stored in the flash memory is swapped with a program code and data which are executed in a predetermined region of the DRAM. Therefore, all application programs can be driven by a small capacity DRAM, and can be easily, individually managed.

What is claimed is:

1. An apparatus for swapping contents of a main memory and an auxiliary memory, comprising:

the auxiliary memory for storing a plurality of application programs including program codes and data;

a virtual address table for storing a start address of each application program stored in the auxiliary memory;

the main memory having a program code region and a data region for storing a program code downloaded from the auxiliary memory and data swapped from the auxiliary memory; and a swapping controller for controlling the program codes of the application programs to be downloaded into the program code region of the main memory with reference to start addresses stored in the virtual address table, and controlling the swapping between the data of the application programs and data stored in the data region of the main memory, in response to a request via a user interface to execute one of said plurality of application programs, wherein said swapping controller controls downloading of only one program code at a time from the auxiliary memory to the main memory in response to the request to execute one of said plurality of execution programs.

2. The apparatus for swapping contents of a main memory and an auxiliary memory as claimed in claim 1, wherein the main memory is one of a DRAM and a high-speed read/write memory and wherein the auxiliary memory is one of a flash memory and a low-speed nonvolatile red/write memory.

3. The apparatus for swapping between contents of a main memory and an auxiliary memory as claimed in claim 1, wherein the main memory is either a DRAM or a high-speed read/write memory and the auxiliary memory is either a flash memory or a low-speed nonvolatile read/write memory.

4. A method of swapping contents of a main memory and an auxiliary memory, comprising:
   (a) determining whether a program code of an application program to be executed exists in a program code region of the main memory;
   (b) downloading an application program code to be executed stored in the auxiliary memory into the program code region of the main memory, when it is determined in step (a) that the program code to be executed does not exist in the main memory;
   (c) swapping data of corresponding to the application program to be executed stored in the auxiliary memory for data stored in a data region of the main memory; and
   (d) loading to a program counter a start address of the program code downloaded into the main memory in step (b) and executing the program code, wherein only one program is downloaded upon determination that the program code of an application program to be executed exists in the program code region of the main memory.

5. The method of swapping contents of a main memory and an auxiliary memory as claimed in claim 4, wherein in said downloading step, only the program code for the application program to be executed is downloaded to the main memory.

6. The method of swapping contents of a main memory and an auxiliary memory as claimed in claim 4, wherein the program code in step (b) is downloaded referring to a virtual address table which stores the start address of each application program stored in the auxiliary memory.

7. The method of swapping contents of a main memory and an auxiliary memory as claimed in claim 4, wherein in the step (b), when another program code exists in the program code region of the main memory, the application program code to be executed is written over the another program code.

8. The method of swapping contents of a main memory and an auxiliary memory as claimed in claim 4, further comprising:

(e) determining whether the program code downloaded in the main memory is a code first loaded after a system is turned on; and
   (f) storing the data in the data region of the main memory in the data region corresponding to a most recently executed application program in the auxiliary memory, when it is determined in step (e) that the program code has been first loaded.

9. The method of swapping contents of a main memory and an auxiliary memory as claimed in claim 4, further comprising:
   (e) determining whether the program code downloaded in the step (b) is data first loaded after a system is turned on; and
   (f) storing data stored in the data region of the main memory in the data region of the application program executed in the step (d), when it is determined in the step (e) that the program code has been first loaded.

10. The method of swapping contents of a main memory and an auxiliary memory as claimed in claim 9, further comprising swapping the data stored in the data region of the main memory for the data stored in the data region of the executed application program, when it is determined in the step (e) that the program code has not been first loaded.

11. The method of swapping contents of a main memory and an auxiliary memory as claimed in claim 4, further comprising:
    (e) determining whether an execution command of another application program is input by a user; and
    (f) storing the data stored in the data region of the main memory in the data region corresponding to a most recently executed application program and storing data of the another application program in the data region of the main memory, when it is determined in the step (e) that the execution command of the another application program has been input.

12. The method of swapping between a main memory and an auxiliary memory as claimed in claim 10, wherein when it is determined that the program code of another application program was executed in the program code region of the main memory two or more times, data of the another application program is swapped for data in the data region of the main memory.

13. A web video phone wherein contents of a DRAM and a flash memory are swapped wherein the flash memory stores application programs for at least a video phone using a H.324 protocol, an Internet phone using a H.323 protocol, a web browser, an e-mail program, and a personal information management system (PIMS) and wherein the DRAM includes a program code region and a data region for storing program codes downloaded from the flash memory and data swapped from the flash memory, said web video phone comprising:
    a key input unit for inputting a command of execution of an application program; and
    a main processor for controlling the program code of each application program stored in the flash memory to be stored in the program code region of the DRAM and controlling the swapping between the data of each application program stored in the flash memory and the data stored in the data region of the DRAM, in response to an execution command of an application program input through the key input unit.

14. The web video phone as claimed in claim 13, wherein the main processor controls storing of only one program code at a time from the flash memory to the DRAM in response to the execution command of a single application program input through the key input unit.

15. An apparatus for swapping between contents of a main memory and an auxiliary memory, comprising:

an auxiliary memory for storing a plurality of application programs including program codes and data;

a virtual address table for storing a start address of each application program stored in the auxiliary memory;

a main memory having a program code region and a data region for storing a program code downloaded from the auxiliary memory and data swapped for the auxiliary memory; and a swapping controller for controlling the program codes of the application programs to be downloaded into the program code region of the main memory and executed with reference to addresses stored in the virtual address table and controlling the swapping between the data of the programs and data stored in the data region of the main memory, in response to a request by a user interface to execute the application programs, and controlling the swapping between the data of the application programs executed in the main memory and the data of corresponding application programs in the auxiliary memory, in response to a request by a user interface to end the application programs.

16. A method of swapping between contents of a main memory and an auxiliary memory, comprising the steps of:

(a) determining whether a program code of an application program downloaded into the main memory from the auxiliary memory is the first one after a system is powered on;

(b) executing the program code of the application program in the main memory, when it is determined in step (a) that the program code is the first one downloaded into the main memory;

(c) swapping data stored in a data region of a corresponding application program in the auxiliary memory for data stored in the data region of the main memory, and executing the code of the application program in the main memory, when it is determined in step (a) that the program code is not the first one downloaded into the main memory; and (d) storing the data of the application program executed in step (b) in the data region of a corresponding application program in the auxiliary memory and swapping the data of the application program executed in step (c) for the data of the corresponding application program in the auxiliary memory, when a command for ending the application program is received.

17. A method of swapping between contents of a main memory and an auxiliary memory, comprising the steps of:

(a) determining whether a program code of an application program downloaded into the main memory from the auxiliary memory is a code loaded into the main memory two or more times after a system is powered on;

(b) swapping data stored in a data region of the main memory for data stored in the data region of an application program in the auxiliary memory, and executing the program code of the application program in the main memory, when it is determined in step (a) that the program code is a code downloaded into the main memory two or more times; and (c) swapping the data of the application program executed in step (b) for the data of the corresponding application program in the auxiliary memory, when a command for ending the application program is received.

18. A web video phone wherein contents of a DRAM and a flash memory are swapped, comprising:

a key input unit for inputting a command of execution of an application program;

a flash memory for storing at least one application program selected from the group consisting of a video phone using the H.324 protocol, an Internet phone using the H.323 protocol, a web browser, an e-mail, and a personal information management system (PIMS):

a DRAM including a program code region and a data region for storing program codes downloaded from the flash memory and data swapped from the flash memory; and a main processor for controlling the program code of each application program stored in the flash memory to be stored in the program region of the DRAM and executed and controlling the swapping between the data of each application program stored in the flash memory to be stored in the data region of the DRAM, in response to an execution command of an application program input through the key input unit, and controlling the swapping between the data of the application programs executed in the DRAM and the data of corresponding application programs in the flash memory, in response to a request by a user interface to end the application programs.

* * * * *